United States Patent [19]
Larsen et al.

[11] Patent Number: 5,952,762
[45] Date of Patent: Sep. 14, 1999

[54] SLIP RING AMPLIFIER

[75] Inventors: Hugh W. Larsen, Milford; Jeffrey A. Menosky, Charlevoix, both of Mich.

[73] Assignee: Michigan Scientific Corporation, Milford, Mich.

[21] Appl. No.: 09/040,818

[22] Filed: Mar. 18, 1998

Related U.S. Application Data

[60] Provisional application No. 60/041,295, Mar. 18, 1997.

[51] Int. Cl.$^6$ .................................................. H01R 39/08
[52] U.S. Cl. ........................... 310/232; 310/248; 340/540
[58] Field of Search .................................... 310/232, 248, 310/68 B; 340/540; 318/475

[56] References Cited

U.S. PATENT DOCUMENTS

| | | | |
|---|---|---|---|
| 4,019,104 | 4/1977 | Parker | 318/832 |
| 4,235,316 | 11/1980 | Blomberg | 188/181 R |
| 4,252,388 | 2/1981 | Brady | 340/540 |
| 4,294,500 | 10/1981 | Wilson | 439/24 |
| 4,329,004 | 5/1982 | Lewis | 439/26 |
| 4,447,752 | 5/1984 | Boyce et al. | 310/232 |
| 4,492,906 | 1/1985 | Goto et al. | 318/488 |
| 4,523,482 | 6/1985 | Barkhoudarian | 73/862.336 |
| 4,712,433 | 12/1987 | Hochstein et al. | 73/862.334 |
| 5,321,374 | 7/1993 | Larsen et al. | 340/540 |
| 5,591,925 | 1/1997 | Garshelis | 73/862.335 |

Primary Examiner—Nestor Ramirez
Assistant Examiner—Joseph Waks
Attorney, Agent, or Firm—Young & Basile, P.C.

[57] ABSTRACT

A slip ring amplifier has a rotor fixedly mountable on a rotatable tubular member and carrying an amplifier mounted in a recess connected to a sensor fixedly mountable on the rotatable member. A stationarily mounted stator is coupled to the rotor by bearings. A slip ring brush block with leaf contacts is mounted in a cavity between the rotor and the stator. End caps are mounted on opposite ends of the rotor and the stator and fixed to one of the rotor and stator. Labyrinth seals are disposed between each end cap and the stator. In one embodiment, an electrolytic fluid fills the cavity between the rotor and stator and surrounds the brush block and leaf contacts. In another embodiment, a dielectric coating is provided on the leaf contacts. Conductors extend from the leaf contacts through the stator to a connector fixedly mounted on the stator.

16 Claims, 5 Drawing Sheets

SLIP RING AMPLIFIER

CROSS REFERENCE TO CO-PENDING APPLICATION

Applicants hereby claim the benefit of provisional application Serial No. 60/041,295 filed Mar. 18, 1997 in the names of Hugh W. Larsen and Jeffrey A. Menosky, and entitled "Slip Ring Amplifier".

BACKGROUND OF THE INVENTION

Field of the Invention

The present invention relates, in general, to devices for conducting electrical signals between bodies undergoing relative rotational motion and, more specifically, to electrical slip rings.

Electrical slip rings are widely used to conduct electrical signals between a first stationary body and a second body undergoing rotation relative to the first body. A typical slip ring includes a stator and a rotor rotatably connected thereto. A number of brushes and contact rings are mounted on the stator and rotor and are disposed in continuous sliding contact, unless a brush lifter mechanism which separates the brushes from the contact rings is activated. One to several brushes may be in contact with each contact ring. Either the brushes or the contact rings may be mounted on the rotor; while the mating contact ring or brush is mounted on the stator.

Slip rings have been used to provide a connection path for a variety of sensors, such as strain gages, thermocouples, pressure transducers, resistance temperature devices (RTDs), torque transducers, accelerometers, velocity sensors, etc., mounted on a rotating member, such as a train axle or wheel, an automobile wheel, etc., to a data acquisition unit located on the train or vehicle remote from the sensors.

There is a particular need to measure dynamic torques in automobile drive shafts and similar applications. In a common approach, a slip ring assembly is mounted outboard of the front wheel of a front wheel drive vehicle. Wires from the strain gage pass through the universal joints which requires modification of the axle shafts. This requires modification of the axle shafts, and the slip rings are exposed and clearly visible.

There have also been attempts to produce tubular slip ring assemblies that surround axle shafts. However, such tubular slip ring assemblies have not proven to be reliable in use.

Thus, it would be desirable to provide a slip ring for use in a rotating electrical signal generating data acquisition apparatus which overcomes the aforementioned problems relating to the use and construction of slip rings. It would also be desirable to provide such an apparatus which has a small size for easy mounting on an existing rotatable member undergoing testing. Finally, it would be desirable to provide a reliable slip ring apparatus which can be mounted around a tubular insulating member.

SUMMARY OF THE INVENTION

The present invention is a slip ring amplifier which provides output signals representative of a characteristic of a rotatable member or shaft as measured by a sensor fixedly mounted on the rotatable member.

The slip ring amplifier includes sensor means mountable on a tubular member for sensing a parameter of the tubular member. A rotor is adapted to be coupled to the rotatable member. An amplifier means is carried on the rotor and is connected to the sensor means for amplifying an output of the sensor means.

A stator is stationarily positioned adjacent to the rotor. A cavity is formed between the rotor and the stator. A slip ring mounted on one of the rotor and stator is electrically engagable with a leaf contact mounted on the other of the rotor and stator.

Preferably the slip ring is carried on a molded block disposed within the cavity and fixedly mounted on one of the rotor and stator, such as the rotor in a preferred embodiment. The leaf contact is carried on the other of rotor and stator, such as the stator in the preferred embodiment, and electrically contacts the slip ring. An electrical conductor extends from the leaf contact through the stator to a external conductor or cable.

In one embodiment, an electrolytic fluid is disposed in the cavity between the rotor and the stator and surrounds all of the slip rings and leaf contacts to prevent the formation of leakage paths between adjacent disposed slip rings and leaf contacts. In another embodiment, a dielectric coating is applied to each leaf contact to prevent the formation of leakage paths.

Bearings are disposed between the rotor and the stator in one embodiment. Biasing means are provided for biasing the bearings into engagement with the rotor and stator. Shoulders are formed on the rotor to form a seat for the bearings.

First and second end caps are fixedly mounted on opposed ends of the rotor and stator and fixedly connected by means of fasteners extendable through circumferentially spaced bores in the first and second end caps and on opposed sides of the rotor. Each of the first and second end caps have radially spaced inner and outer ends. A first pair of seals are disposed between the inner ends of the first and second end caps and the rotatable tubular member. A second pair of seals are disposed between the outer ends of the first and second end caps and the stator.

In a preferred embodiment, the first seals are engaged by a tapered surface on the inner end of the first and second end caps which forcibly urges the first seals into fixed engagement with the tubular member. Preferably, an adhesive or sealant coating is applied between the first seals and the rotatable member to fixedly mount the first seals on the rotatable member.

The second seals preferably comprise labyrinth-type seals. O-rings carried on the labyrinth seals sealingly mount the labyrinth seals to the outer ends of the first and second end caps and the stator.

The slip ring amplifier apparatus of the present invention provides significant advantages over previously devised slip ring assemblies since it may be easily mounted over any rotatable shaft or tubular member while still enabling conductors to extend externally from the slip ring amplifier to an external data acquisition unit.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 2:
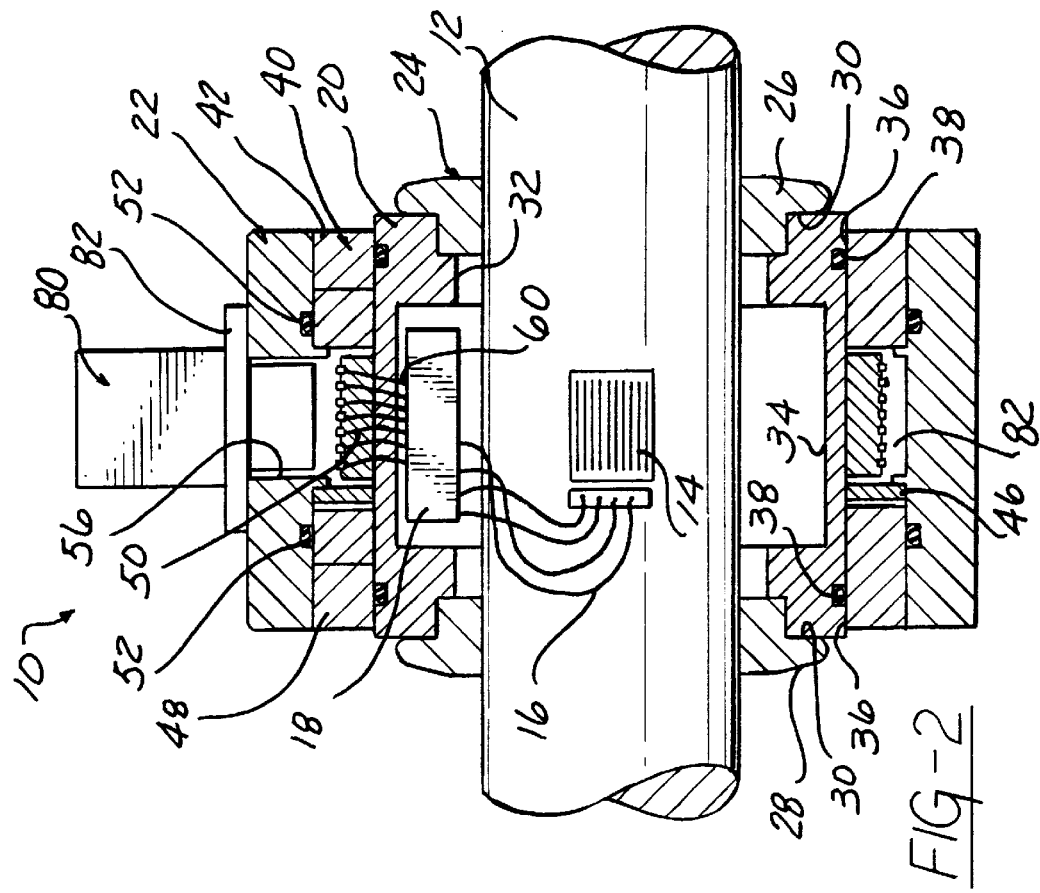
FIG. 2 is a cross-sectional view generally taken along line 2—2 in FIG. 1.

The slip ring amplifier apparatus 10 of the present invention is designed to be mounted about a rotatable shaft 12. The rotatable shaft or member 12 may be any rotating member or device including, but not limited to, automobile wheels, train axles and wheels, airplane propellers, etc.

A sensor means 14 is fixedly mounted on the rotatable shaft 12 by suitable means, such as by an adhesive or other bonding material. The sensor means 14 is designed to sense one operating parameter of the rotatable member 12. The sensor means 14 may comprise any suitable sensor, such as a strain gage, thermocouple, resistance temperature device, accelerometer, velocity transducer, pressure transducer, etc.

In a exemplary embodiment of the present invention, the sensor means 14 is a single sensor in the form of a strain gage which utilizes a resistive wheatstone bridge. Forces exerted on the strain gage by the rotatable shaft 12 result in an unbalance of two sensing resistors in the bridge, which resistance change can be sensed to indicate the amount of force exerted on the rotating member. A detailed explanation of the construction and use of such a sensing bridge can be had by referring to U.S. Pat. No. 5,231,374, the complete contents of which are incorporated herein by reference.

A plurality of conductors 16 extend from the sensor means 14 to an amplifier denoted generally by reference number 18. The amplifier 18 preferably comprises an electronic circuit or module encased within an encapsulating material. The amplifier or electronic module 18 provides sensor signal conditioning, excitation signals to the sensor means 14, and amplifies the output of the sensor means 14. There may also be a provision in the electronic module for shunt calibration of the bridge by remote activation. An example of a typical electronic module and amplifier may be had by referring to the already incorporated by reference U.S. Pat. No. 5,231,374.

Figure 1:
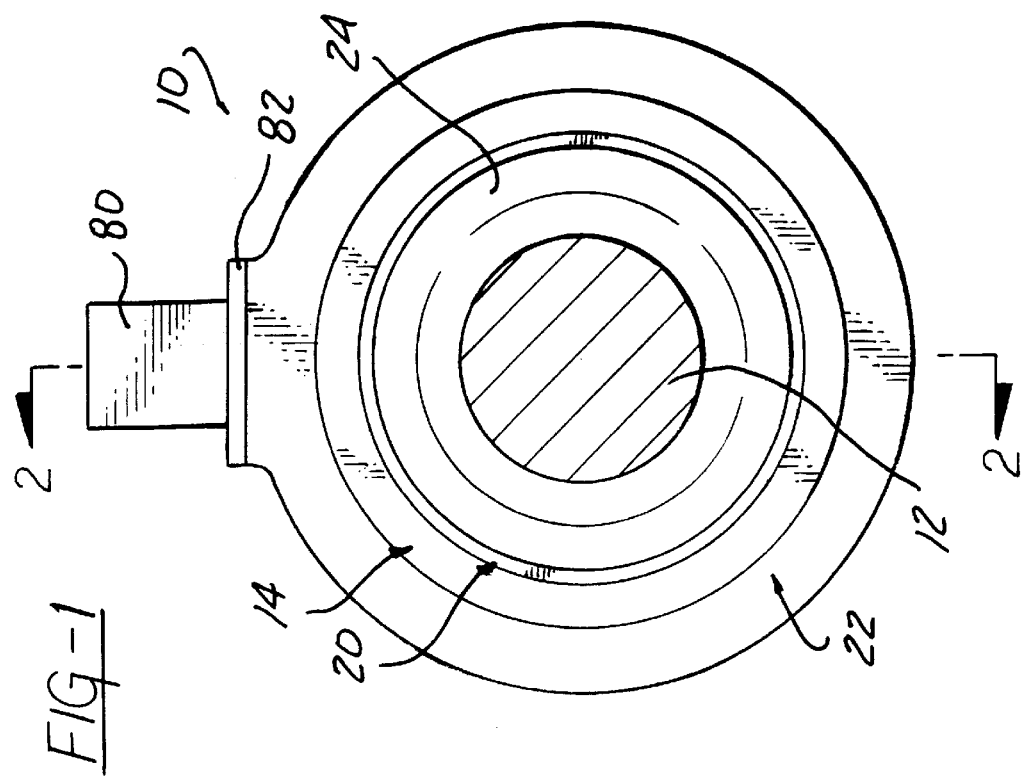
FIG. 1 is an end view of a slip ring amplifier apparatus constructed in accordance with the teachings of the present invention mounted about a rotatable shaft.

As shown in FIGS. 1 and 2, the apparatus 10 includes a rotor 20 and a stator 22. The rotor 20 is fixedly mounted to the rotatable shaft 12 and rotates simultaneously with rotation of the rotatable shaft 12. Meanwhile, the stator 22 is adapted to be stationarily mounted on a stationary support structure, not shown, adjacent the rotatable shaft 12.

A mounting means denoted by reference number 24 provides for fixedly mounting the rotor 20 to the rotatable shaft 12. In a preferred embodiment, the mounting means 24 preferably comprises a pair or first and second annular mounting members 26 and 28 which are axially spaced apart along the rotatable shaft 12 and fixedly mounted to the rotatable shaft 12 by means of a suitable adhesive. The annular mounting members 26 and 28 have an enlarged outer end and an intermediate shoulder 30. The shoulder 30 is designed to securely receive the rotor 20. An adhesive is employed to fixedly mount the rotor 20 to the annular mounting members 26 and 28.

As shown in FIG. 2, the rotor 20 is in the form of an annular member constructed of a suitable material, such as metal, plastic, etc. The rotor 20 has an internal bore 32 which is spaced from the outer periphery of the rotatable shaft 12. An enlarged circumferential recess 34 extends radially outward from the bore 32 and is situated substantially centrally within the axial length of the rotor 20. The amplifier or electronics module 18 is fixedly mounted within the recess 34 by means of an adhesive.

A pair of connectors, such as snap rings 36, are mounted in annular grooves formed at opposed ends of the rotor 20. The purpose of the snap rings 36 will become apparent in the following description. Likewise, a pair of spaced grooves are formed in the outer surface of the rotor 20 at opposite ends of the rotor 20 and receive O-rings 38 to provide a seal to the adjacent seal members 40.

The seal members 40, although illustrated in FIG. 2, as formed of first and second annular members 42 and 44, are preferably each formed of first and second annular members. The seal members 42 and 44 are special lapped metal seals which also form bearings between the rotor 20 and stator 22. The seal members 42 and 44 are held in an axially spaced position by means of the snap rings 36 mounted at the outer ends of the rotor 20.

A biasing means 46, such as a wave washer, is mounted adjacent one axially inner end of one of the seal members 44 and exerts a biasing force to maintain seal members 40 as well as an intermediate brush block 50, described hereafter, in position between the rotor 20 and stator 22.

The stator 22 surrounds the seal members 42 and 44 and is sealingly joined thereto by means of O-rings 52 mounted in grooves formed on a radially inner surface of the stator 22. An annular recess 56 extends through one portion of the stator 22 as shown in FIG. 2. The recess 56 communicates with an axial space or cavity between the first and second seal member 42 and 44.

A conventional brush block 50, shown in FIGS. 2–5 is fixedly mounted within the axial space between the seal members 42 and 44. The brush block 50 is fixedly mounted on the inner surface of the stator 22 by means of an adhesive.

Figure 4:
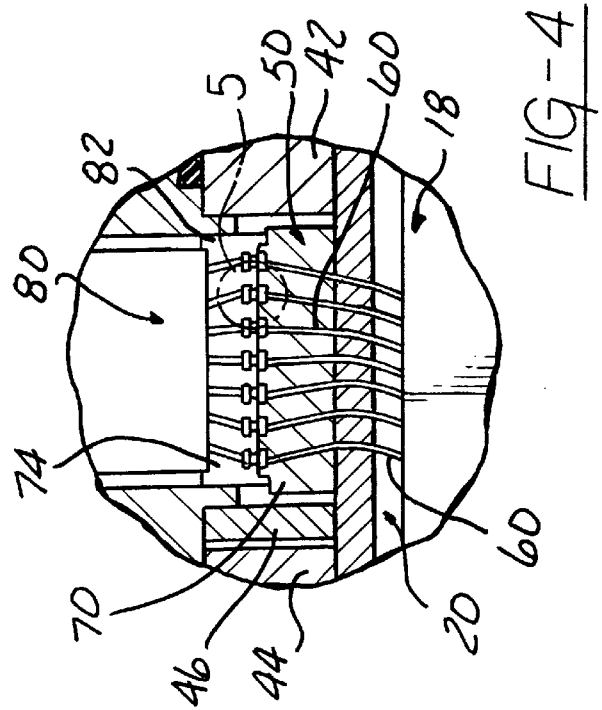
FIG. 4 is an enlarged, partial, broken away view of a portion of the slip ring amplifier apparatus shown in FIG. 2.
Figure 5:
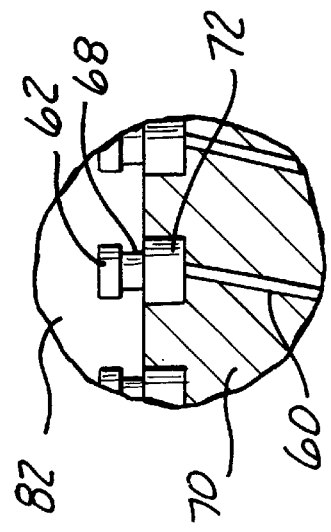
FIG. 5 is an enlarged view of the circled area denoted by reference number 5 in FIG. 4.
Figure 3:
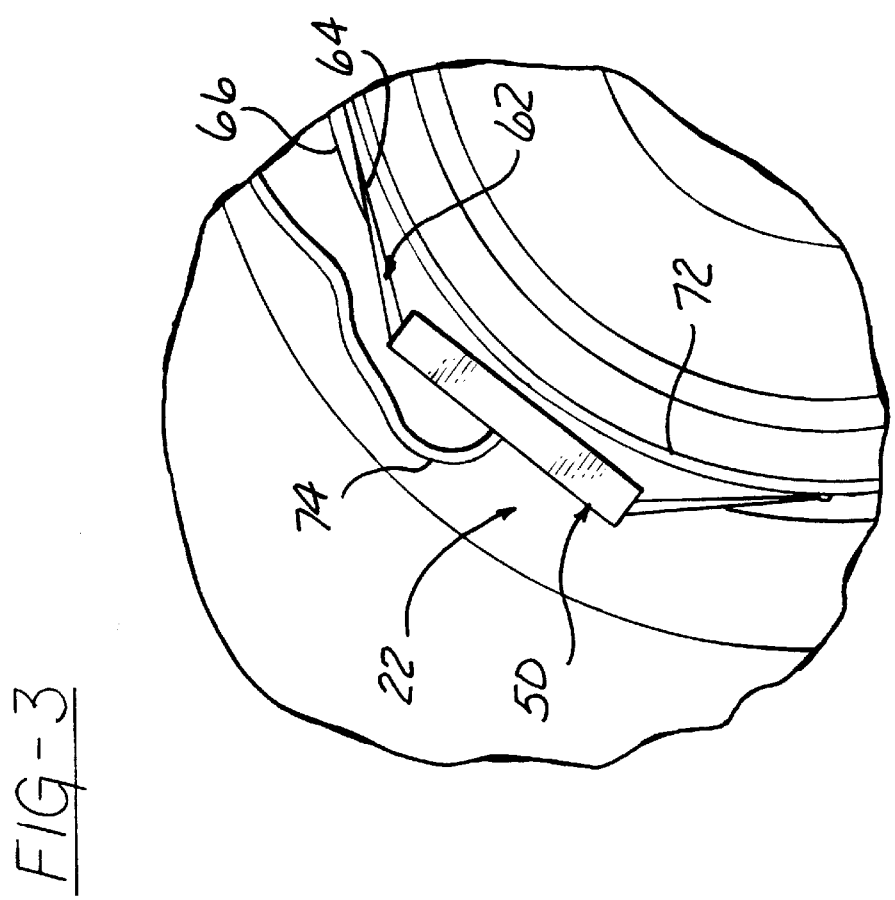
FIG. 3 is an enlarged view of the area denoted by the arrow 4 in FIG. 1.

As shown in FIGS. 3 and 4, each brush 62 of a plurality of brushes 62 mounted on the brush block 50 is formed of two leaf members 64 and 66. The first leaf member 64 comprises the main brush member and has a contact 68 fixedly mounted on an outer end thereof, as shown in FIG. 5. The second leaf member 66 provides a biasing force to the first leaf member 64 to maintain the contact 68 in engagement with a slip ring mounted on the rotor 20.

Bores are formed in a plastic cast part 70 through which one conductor 60 passes from the amplifier or electronic module 18. The cast part 70 is fixed on the rotor 20 by an adhesive. As shown in FIG. 5, the conductor 60 is electrically connected to a slip ring 72. Preferably, a plurality of axially spaced, annular slip rings 72 are formed in spaced channels in the cast part 70. One contact 68 of each brush 62 extending from the brush block 50 mounted in the stator 22 is positioned to engage one slip ring 72. As shown in FIGS. 3 and 4, individual conductors 74 extend from each brush block 50 to a multi-pin connector denoted by reference number 80.

The connector 80 is fixedly mounted to the stator 22, preferably by means of fasteners extending to a mounting flange 81 intermediate the ends of the connector 80 which seats upon a generally flat enlargement on the outer peripheral surface of the stator 22. A mating multi-pin connector, not shown, is attachable to the connector 80 and to a remote data acquisition unit.

In this manner, signals output from the sensor 14 pass to the amplifier/electronic module 18 wherein they are amplified and applied to conductors 60. The signals on conductor 60 are connected to individual slip rings 72 which are contacted by brushes 62. The conductors 74 extending from the brush block 50 conduct the signals from each brush 62 to the individual pins of the connector 80 and outward from the apparatus 10 to a remote data acquisition unit, not shown.

According to a unique aspect of the present invention, the seal members 42 and 44, the O-rings 52, the mounting flange 82 of the connector 80, the stator 22 and the rotor 20 form an annular cavity denoted by reference number 82 in FIGS. 2, 4 and 5 in which the brush block 50 and individual slip rings 72 are disposed. An electrolytic fluid is disposed within the cavity 82. The electrolytic fluid surrounds the brushes 62 and the slip rings 72 and serves to flush away any wear debris generated from sliding contact of the brushes 62 on the slip rings 72. The fluid prevents the development of electrical leakage paths between the spaces in slip rings 72 and also from the slip rings 72 to the surrounding stator 22 and rotor 20. This improves the reliable performance of the slip ring amplifier 10 of the present invention. The electrolytic fluid also provides lubrication for the seal or bearing members 42 and 44.

The mounting of the amplifier/electronic module 18 within the rotor 20 increases the amplitude of the signal level generated from the sensor 14 so that there is less susceptibility to interference from various electromagnetic noise sources, such as vehicle electrical systems, and off vehicle devices, such as radio transmitters or high voltage power lines.

Referring now to FIGS. 6–10, there is depicted another embodiment of a slip ring amplifier apparatus 100 according to the present invention. The slip ring amplifier apparatus 100 is mountable about any rotatable tubular shaft 12, such as an automobile drive shaft, automobile axle, etc. The sensor means 14, as described above in the first embodiment of the slip ring amplifier 10, is fixedly mountable on the rotatable shaft 12 by suitable means, such as by an adhesive or other bonding material. The sensor means 14 is operative to sense one operating parameter of the rotatable member 12. Specifically, the sensor means 14 may be a strain gage, thermocouple resistance temperature device, accelerometer, velocity transducer, pressure transducer, etc. In an exemplary embodiment, the sensor means 14 is a single sensor in the form of a strain gage in which the individual resistive elements are connected in a resistive whetstone bridge. Force exerted on the sensor or strain gage 14 by the rotatable shaft 12 results in an unbalance of two sensing resistors in the bridge, which resistance change can be sensed to indicate the amount of force exerted by the rotating member 12.

Figure 6:
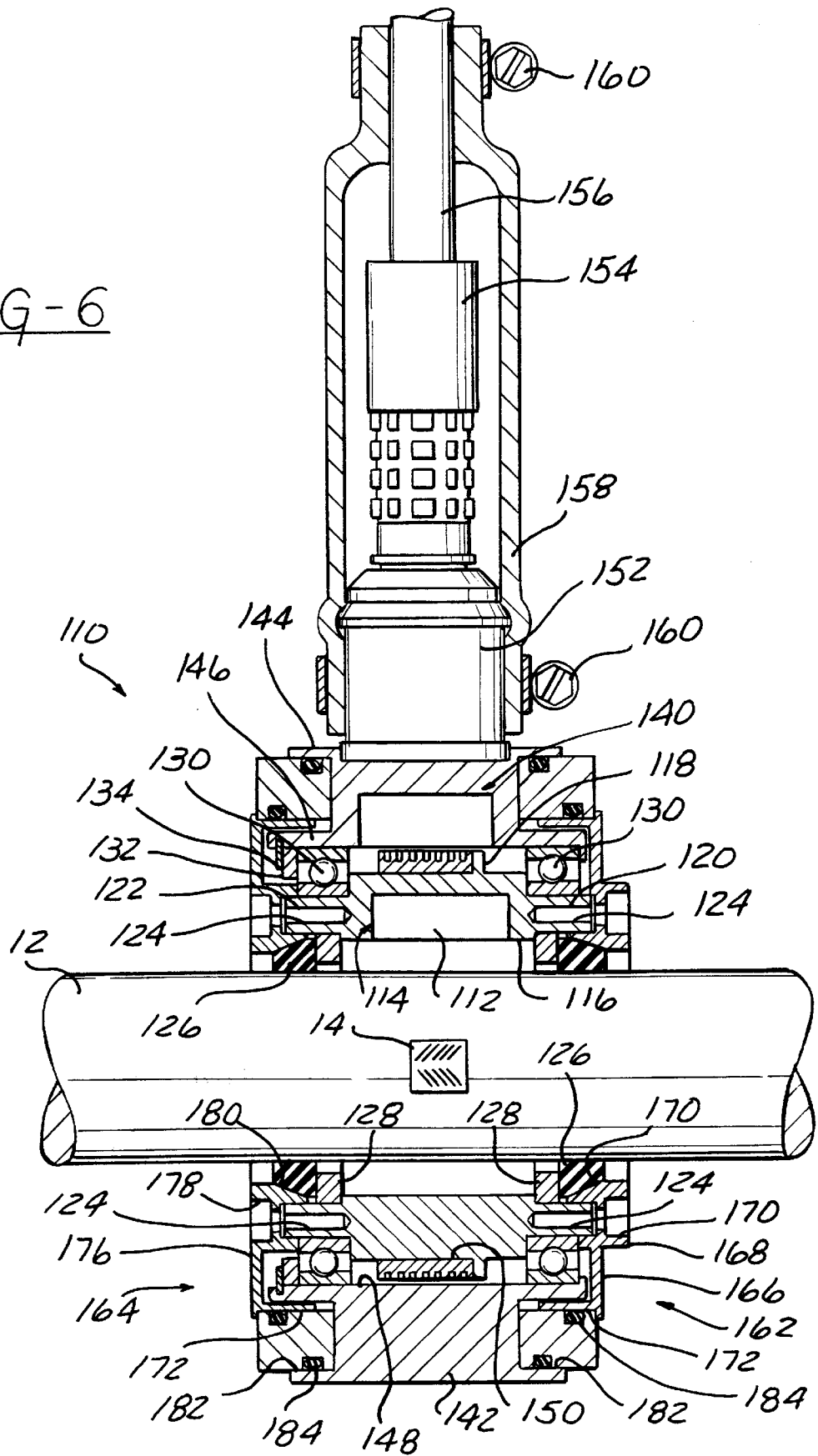
FIG. 6 is a longitudinal cross-section of another embodiment of a slip ring amplifier shown mounted on a tubular rotatable shaft.
Figure 7:
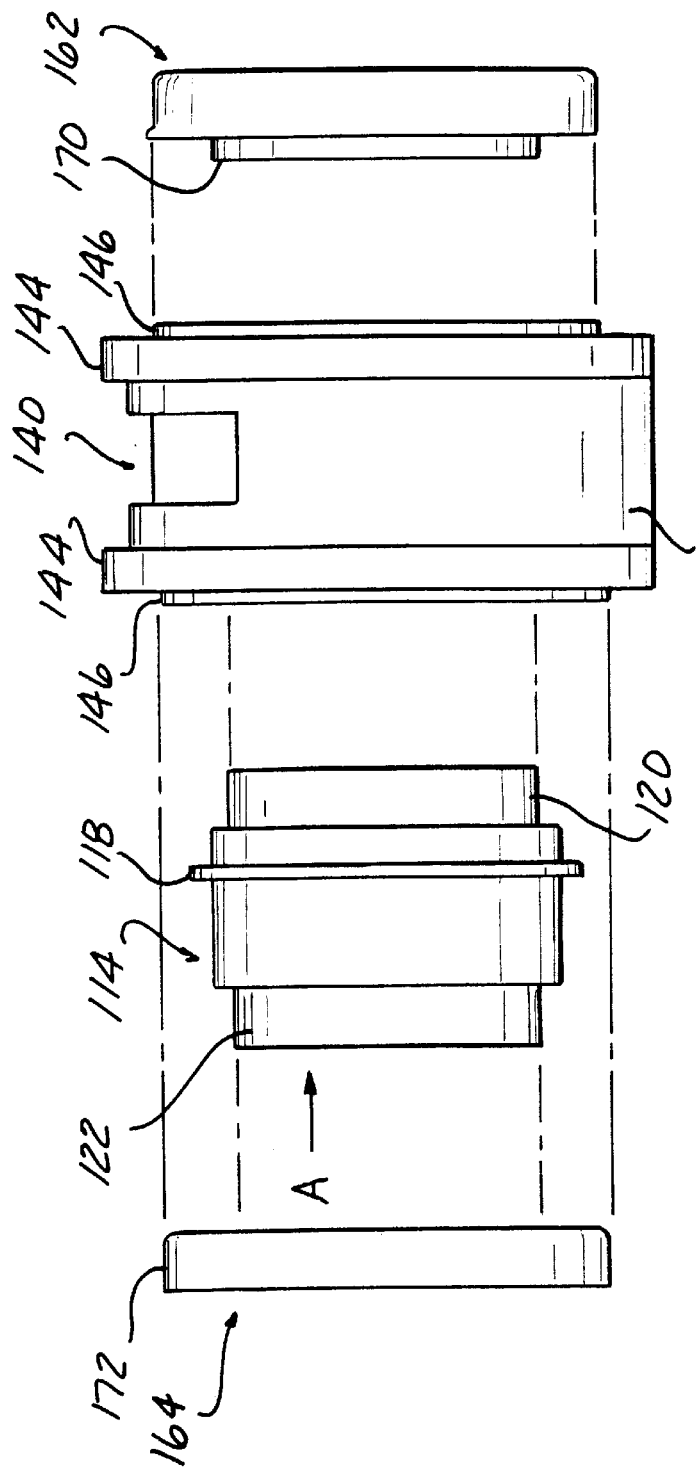
FIG. 7 is an exploded, side elevational view of the slip ring amplifier shown in FIG. 6.

A plurality of conductors, not shown in FIG. 6 for clarity, but identical to the conductors 16 shown in FIG. 2 and described above, extend from the sensor means 14 to an amplifier 112 fixedly mounted within a recess in a rotor 114 by means of an adhesive or other suitable fastener means. The amplifier 112 provides sensor signal conditioning, excitation signals and amplification of the output of the sensor means 112. There may also be a provision in the amplifier 112 for a shunt calibration of the bridge by remote activation. An example of a typical electronic module and amplifier 114 may be had by referring to the amplifier described in U.S. Pat. No. 5,231,374, the relevant portions of which pertaining to the construction and use of the amplifier 14 are incorporated herein by reference.

The rotor 114 has an annular shape with a central annular portion containing a recess or bore in which the amplifier 112 is mounted. The inner surface 116 of the rotor 114 is spaced from the exterior surface of the rotatable shaft 12 on which it is mounted, by an annular cavity. A radially extending rib 118 projects outwardly from an exterior surface of the central portion of the rotor 114, for purposes which will become more apparent in the following description.

A pair of annular opposed wings 120 and 122 extend outward from opposite sides of the central portion of the rotor 114. Each of the wings 120 and 122 includes a plurality of circumferentially spaced, hollow bores 124 which are adapted for receiving threaded fasteners, not shown, as described hereafter.

Figure 8:
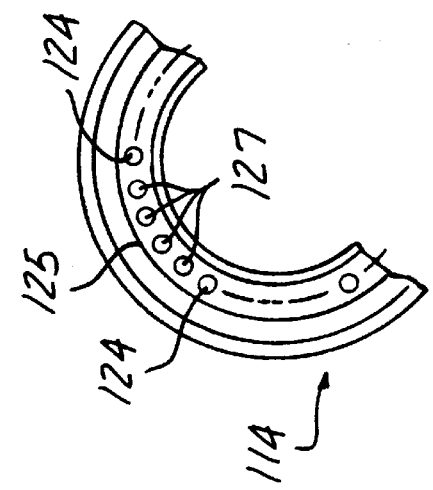
FIG. 8 is a partial, end view of the rotor taken in the direction of the arrow in FIG. 7.
Figure 9:
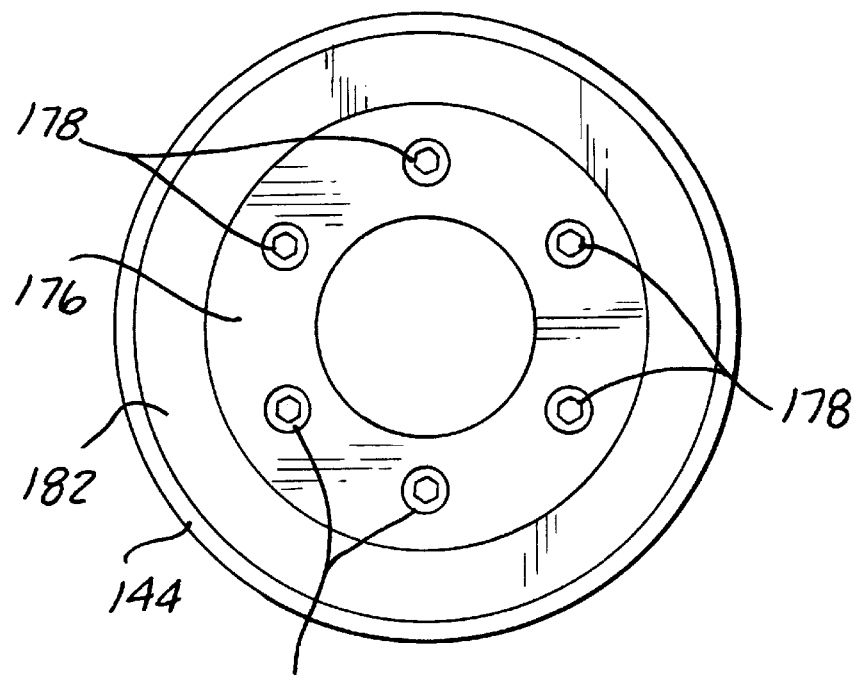
FIG. 9 is a partial, left hand, end elevational view of the slip ring amplifier shown in FIGS. 6 and 7.
Figure 10:
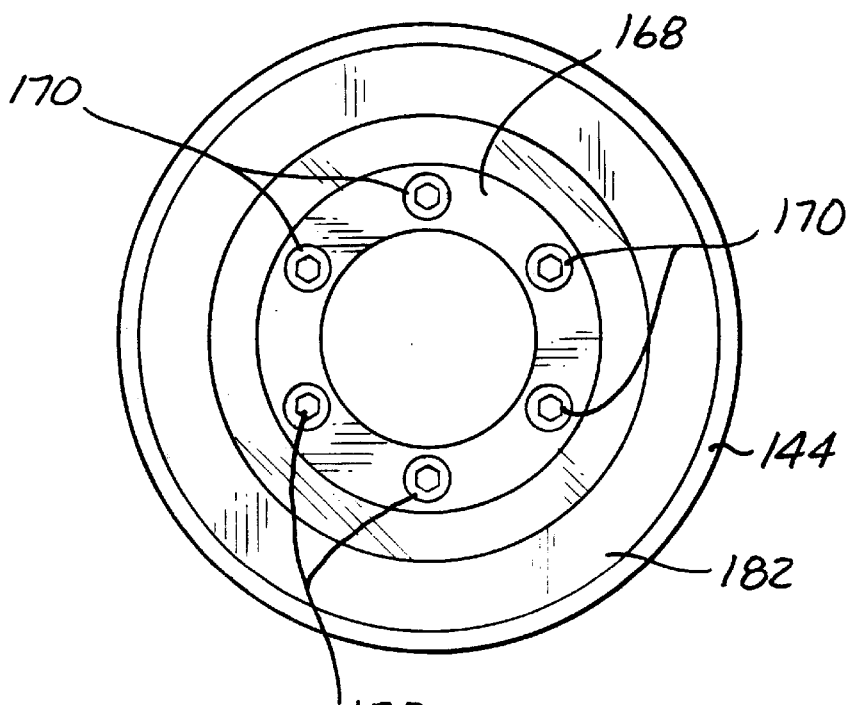
FIG. 10 is a partial, right hand, end elevational view of the slip ring amplifier shown in FIGS. 6 and 7.

In an exemplary embodiment shown in FIG. 8, the four wires from the sensor or strain gage 14 pass through a bore 129 in the wing 122 of the rotor 114 and are looped back and connected to solder terminals 127 mounted in the wing 122 on opposite sides of the bore 129. The solder terminals 127 are preconnected to the amplifier 112.

The rotor 114 is fixedly mounted on the rotatable shaft 12 by means of a pair of elastomeric compression seals 126 mounted on opposite sides of the rotor 114 generally within recesses formed by the wings 120 and 122. Optional backup washers 128 are mounted in shoulders adjacent each wing 120 and 122 and the inner surface of the central portion of the rotor 114 and are seated between the shoulders on the rotor 114 and each seal 126. End caps, described hereafter, are engaged with the rotor 114 and the seals 126 to fixedly mount the rotor 114 on the shaft 12.

The seals 126 are provided with a coating of a suitable sealant or adhesive, such as one sold by Dow-Corning as Product No. 3145RTV. The adhesive is placed on the seal to medal interface between each seal 126 and the exterior surface of the rotatable shaft or member 12.

A biasing means 132, such as a wave washer, engages one of a pair of bearings 130 supported on the wings 120 and 122 to maintain the bearings 130 in engagement with the rotor 114. A retaining member or ring 134 engages the biasing means or wave washer 132 to retain the wave washer 132 in a fixed position. The retaining ring 134, which has an annular, disc-like shape with a central aperture, is fixedly carried on a stator 140.

The stator 140 is also in the form of an annular member surrounding the rotor 114. The stator 140 includes an annular central portion 142 and first and second spaced pairs of annular wings 144 and 146 which extend laterally outward from opposite sides of the central portion 142.

The central portion 142 of the stator 140 is spaced from the rotor 114. The radially inner surface 148 of the stator 140 engages the bearings 130. The biasing means or wave washer 132 is mounted in a recess in the inner surface of one wing 146.

A conventional molded slip ring assembly 150 containing a plurality of channels in each of which an individual electrically conductive slip ring is disposed is fixedly mounted on the exterior surface of the central portion of the rotor 114, with the slip rings facing radially outward from the slip ring assembly or block 150. One edge of the block 150 contacts the annular rib 118 on the rotor 114. The block 150 is secured to the rotor 114 by an adhesive or other suitable fastening means.

A conventional brush block, not shown, but similar to the brush block 50, described above and shown in FIGS. 3, 4 and 5, is fixedly mounted or carried within the central portion 142 of the stator 140. A plurality of brushes, each formed of one or two leaf contacts, are mounted in the brush block and engage one of the slip sings in the slip ring assembly 150. The brushes or leaf contacts may be constructed similar to the brushes 62 described above in the first embodiment of the slip ring amplifier 10.

Bores, not shown, are formed through the central portion 142 of the stator 140 and receive electrical conductors which are attached to sockets or mounting pins contained within a connector mount 152 which is fixedly connected, typically by means of fasteners on a peripheral flange directly to the stator 140. The sockets or pins in the connector mount 152 releasible engage mating pins or sockets in a conventional connector plug 154. A multi-conductor cable 156 extends from the connector plug 154 external of the slip ring amplifier 110 to an external data acquisition unit, not shown. A protective rubber boot 158 is fixedly mounted about the connector mount 152 and the cable 156 by means of suitable fasteners, such as hose clamps 160.

The cable 156 can be tied or secured to adjacent structure which is stationary relative to the rotatable tubular member 12. Alternately, a spring, not shown, can be secured between the stationary structure and the boot 158 or the connector mount 152 to retain the stator 140 stationary relative to the rotating tubular member 12 and the rotor 114.

The leaf contact members, similar to leaf members 64 and 66 in the first embodiment of the present invention which are shown in FIG. 3, are preferably coated with a dielectric material to prevent the development of electrical leakage paths between the adjacent disposed leaf contact members. Further, although the annular cavity between opposed faces of the rotor 114 and the stator 140 and in which the slip ring assembly 150 and leaf members are disposed may be filled with an electrolytic fluid, as described in the first embodiment, in this embodiment, the cavity is empty.

First and second end caps 162 and 164, respectively, are provided for closing the interface between the rotor 114 and the stator 140 as well as to retain the rotor 144 and stator 140 rotatably engaged with the bearings 130. The first end cap 162 is provided with an annular wall 166 from which an annular boss 168 protrudes. The annular boss 168 includes a plurality of circumferentially spaced bores 170 which are alignable with the bores 124 in the rotor 114 to enable fasteners to be extended therethrough to fixedly join the first end cap 162 to one side of the rotor 114.

A first annular tapered edge 170 protrudes inward from the wall 166 and engages a mating tapered surface or edge on one of the seals 126 to forcibly engage the seal 126 with the rotatable shaft or member 12. A second annular flange 172 is spaced radially outward from the first tapered surface 170 and is disposed to slidably surround and be spaced a short distance from the wing 146 of the stator 140. In this manner, the first end cap 162 closes one side of the rotor 114 and the stator 140 and provides a seat for bearings 130.

The second end cap 164 has an annular outer wall 176. The second end cap 164 is provided with a plurality of circumferentially spaced bores 178 which are alignable with the bores 124 on one side of the rotor 114 and receive fasteners, not shown, for fixedly mounting the second end cap 164 to the opposite side of the rotor 114. An inner edge of the wall 176 is provided with a tapered surface which forcibly engages a mating tapered surface on one of the compression seals 126 to forcibly urge the compression seal 126 into secure engagement with the exterior surface of the rotatable shaft 12.

As shown in FIG. 6, a pair of annular, labyrinth seals 182 are disposed between a radially inward flange 172 on the outer periphery of the second end cap 162 and the wings 144 on the stator 140. Seal members, such as O-rings 184, are carried in each labyrinth seal 182 to sealingly couple each labyrinth seal 182 to the adjoining flange 172 on the second end cap 164 and the wing 144 on the stator 140.

In summary, there has been disclosed a unique slip ring amplifier which can be easily and simply mounted on a rotating tubular member, such as an automobile drive shaft, axle, wheel, etc, and which provides amplified output signals in a plurality of channels through a slip ring to an external data acquisition unit. The slip ring amplifier is designed to be mounted directly on the rotating tubular member in a minimal amount of space. The present amplifier is also designed to minimize or prevent leakage paths between adjacent slip rings, brushes or leaf contacts.

What is claimed is:

1. A slip ring amplifier apparatus mountable on a rotatable tubular member comprising:

sensor means mounted on a tubular member for sensing a parameter of the tubular member;

a rotor adapted to be coupled to the tubular member;

amplifier means, carried on the rotor and connected to the sensor means, for amplifying an output of the sensor means;

a stator stationarily positioned adjacent to the rotor;

a cavity formed between the rotor and the stator; and a slip ring mounted on one of the rotor and stator and electrically engagable with a leaf contact mounted on the other of the rotor and stator, and wherein the one slip ring is carried on the rotor and disposed in the cavity between the rotor and the stator; and the leaf contact is carried on the stator and is electrically engagable with the one slip ring; and an electrical conductor extending from the leaf contact externally of the stator.

2. The apparatus of claim 1 further comprising connector means, connected to the electrical conductor extending from the contact, for connecting the electrical conductor to an external circuit.

3. The apparatus of claim 1 further comprising;

an electrolytic fluid disposed in the cavity and surrounding the slip ring and the leaf contact.

4. The apparatus of claim 1 further comprising:

a dielectric coating disposed on the leaf contact.

5. The apparatus of claim 1 further comprising:

seal means disposed between the rotor and the stator for sealingly coupling the rotor and the stator.

6. The apparatus of claim 1 further comprising;

biasing means for biasing the leaf contact into engagement with the slip ring.

7. The apparatus of claim 1 further comprising:

bearings disposed between the rotor and the stator.

8. The apparatus of claim 7 further comprising:

biasing means for biasing the bearings and the rotor into engagement.

9. The apparatus of claim 8 further comprising:

annular shoulders formed on the rotor, the bearings engaging the shoulders.

10. The apparatus of claim 1 further comprising:

first and second end caps fixedly mounted on opposed ends, respectively, of the rotor and the stator.

11. The apparatus of claim 10 wherein each of the first and second end caps comprise:

radially spaced inner and outer ends;

a first seal disposed between the inner ends of each of the first and second end caps and the tubular member; and a second seal disposed between the outer ends of each of the first and second end caps and the stator.

12. The apparatus of claim 11 wherein:

the first seals include annular elastomeric members adapted to be disposed in engagement with the tubular member; and the first and second end caps have a tapered surface engagable with the elastomeric members to forcibly urge the elastomeric members into sealing engagement with the tubular member.

13. The apparatus of claim 11 wherein:

the first seals comprise elastomeric seals fixably mounted by an adhesive coating to the tubular member.

14. The apparatus of claim 11 wherein the second seals comprise labyrinth seals.

15. The apparatus of claim 14 further comprising;

O-rings sealingly disposed between the labyrinth seals and outer ends of the stator and the first and second end caps.

16. The apparatus of claim 10 further comprising:

each of the first and second end caps including a plurality of circumferentially spaced bores; and a plurality of outwardly extending bores formed on opposite sides of the rotor and alignable with bores in the first and second end caps for receiving fasteners therethrough to fixedly join the first and second end caps to opposite sides of the rotor, respectively.

* * * * *